United States Patent [19]

Chen

[11] Patent Number: 5,087,465

[45] Date of Patent: Feb. 11, 1992

[54] METHOD OF MANUFACTURING SOYBEAN CURD

[76] Inventor: Richard K. Chen, Room 803, Star House, 3 Salisbury Road, Kowloon, Hong Kong

[21] Appl. No.: 688,013

[22] Filed: Apr. 19, 1991

[51] Int. Cl.$^5$ .............................................. A23L 1/00
[52] U.S. Cl. .................................... 426/241; 426/407; 426/634
[58] Field of Search ............... 426/241, 243, 634, 407, 426/412, 598

[56] References Cited

U.S. PATENT DOCUMENTS 4,678,677 7/1987 Sugisawa et al. .................... 426/634
4,965,080 10/1990 Akasaka et al. ...................... 426/634

*Primary Examiner*—George Yeung
*Attorney, Agent, or Firm*—Jordan and Hamburg

[57] ABSTRACT

Soybean curd is manufactured by mixing soybean milk with a coagulating agent, continuously filling the resulting liquid mixture into containers, continuously passing the containers through a zone in which the liquid mixture receives sufficient microwave energy to heat the interior of the mixture to a temperature in a range of about 75°-85° C., removing the containers from the zone and maintaining the containers at a temperature in a range of about 80°-90° C. for about 20-50 minutes or first at a temperature in a range of about 80°-90° C. for about 10-15 minutes and immediately thereafter at a temperature of about 50°-65° C. for about 15-25 minutes, and cooling and storing the resulting soybean curd in a refrigerated room.

20 Claims, 3 Drawing Sheets

METHOD OF MANUFACTURING SOYBEAN CURD

BACKGROUND OF THE INVENTION

The present invention relates to a method of manufacturing soybean curd employing microwave processing.

Traditionally, soybean curd has been made by adding calcium sulfate, calcium chloride, or agents similar to these inorganic chemicals, to hot soybeam milk. These coagulating agents have been found to be very effective. Coagulation is followed by pressing to expel the whey from the curd and to shape-form the curd. This traditional method of production is entirely batch oriented.

A new acidic type coagulating agent, glucono-delta-lactone, (hereafter "GDL") has been developed in the 1960's. This agent produces an even, fine-grained soybean curd. Using GDL as the coagulation agent, the accepted practice of manufacturing soybean curd is as follows: After the soybean milk is boiled and filtered, it is cooled to room temperature. GDL is added to the soybean milk and thoroughly mixed therein. Packaging containers are filled with this soybean milk-coagulant mixture. These containers are immersed in a constant temperature hot water bath for a long period of time until the curd is formed. This process has been developed to a state of art by which continuous production of soybean curd is possible. Prior art relating to the use of GDL in the manufacture of soybean curd includes the following U.S. Pat. Nos. 4,000,326; 4,140,811; 4,514,433; 4,537,789; 4,585,665; 4,636,398; 4,789,556; 4,826,701; and 4,828,869.

GDL is derived from glucose and forms white, odorless crystals. It is used extensively in the food industry as an acidulant. In water, it is hydrolyzed and decomposes to give gluconic acid, which is the actual active agent as acidulant. Likewise, for the coagulation of soybean curd, gluconic acid is the active coagulation agent.

GDL is stable in powder form. It is freely soluble in water. When added to water, it slowly hydrolyzes to form an equilibrium mixture of gluconic acid and its delta- and gamma-lactones, as shown in the following equation.

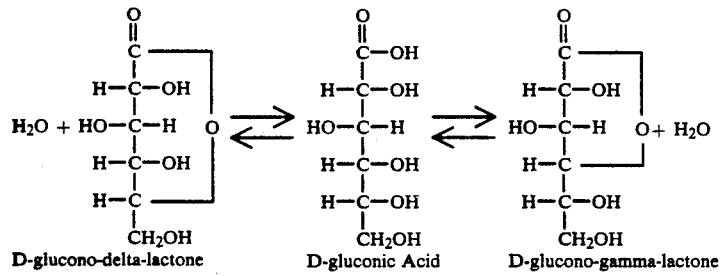

D-glucono-delta-lactone    D-gluconic Acid    D-glucono-gamma-lactone

At room temperature, complete hydrolysis occurs in about three hours. FIG. 1 shows the extent of acid formation with increase in elapsed time of buffered aqueous GDL solutions at various concentration levels at 20° C. If curves No. 1 and No. 2 of FIG. 1 are compared, it is noted that for solutions of same concentration, the initial hydrolysis rate is much higher for a more neutral solution than for a more acidic solution. Gluconic acid being the coagulant, a higher release rate of gluconic acid will give the coagulant a higher concentration immediately and, after any total elapsed time from the initial introduction of the gluconic acid, a longer period of higher concentration to diffuse throughout the soybean milk. It can also be concluded that in a non-buffered solution as hydrolysis proceeds the amount of gluconic acid that is formed will actually depress the subsequent rate of hydrolysis of GDL. But a depletion of gluconic acid, such as occurs when gluconic acid is removed from the soybean milk as it coagulates the soybean milk into soybean curd, will induce more hydrolysis of the lactones.

Another notable property of the rate of hydrolysis of GDL can be studied by referring to FIG. 2 which is a plot of degree of hydrolysis, represented in terms of pH value of the solution vs. elapsed time for a 1% GDL aqueous solution at temperatures of 5°, 20°, 50°, and 90° C. These curves all show inverted exponential characteristics, i.e., the rate increases rapidly during initial stage, reaches a maximum, and decreases to a minimum value, with this feature becoming more pronounced at higher temperatures of 50° C. and 90° C. It can be seen that at 90° C. an equilibrium pH value of 2.5-2.6 is reached after an elapsed time of only about 5 minutes. It is thus most advantageous to operate the coagulation at a temperature of about 90° C. to achieve maximum rate of hydrolysis of GDL.

The industrial practice in Japan for the production of soybean curd, or, by its Japanese name, "tofu," is to operate the coagulation step at 80°-90° C. by means of a hot water bath and with the immersion time being 40-50 minutes to give good coagulation results. However, the machinery for a hot water bath for continuous production is complex and costly to build. Also, the processing efficiency is lowered because of the time needed to conduct heat from the hot water bath into the contents of containers of soybean milk-coagulant liquid mixture to raise the temperature of the liquid.

SUMMARY OF THE INVENTION

The present invention relates to process improvements in the production of soybean curd through the utilization of microwave heating.

As can be seen from FIG. 2, the rate of hydrolysis of GDL in its aqueous solution at 90° C. increases exponentially during an initial period of 5 minutes. To take maximum advantage of this characteristic, it would be best to bring the temperature of a coagulant-soybean milk mixture swiftly to 90° C. and then maintain the temperature within the 80°-90° C. range for a further period of time for the coagulation step to initiate and complete. It has been discovered that this objective of the present invention can be effected by subjecting the coagulant-soybean milk mixture to microwave heating.

Microwave energy in a short burst amounting to an appropriate dosage will instantly raise the temperature of coagulant-soybean milk liquid to a desired level. From the dielectric and thermal properties of the soybean milk the amount of microwave energy to be applied can be calculated. The objective of microwave heating is to bring the liquid instantly to temperature levels at which the rate of hydrolysis of GDL is high enough to release significant amount of gluconic acid. A temperature range of about 50°-90° C. should be achieved in this step. There is a temperature distribution in the liquid, which is a result of application of microwave energy in a short burst, but this has no adverse effect on the process. The length of time during which the microwave energy is applied as a short burst is calculated to be such that the total amount of microwave energy received by the liquid will not raise the temperature of the liquid above about 90° C. In the general practice of the invention, the interior temperature of the liquid is elevated to a range of about 75°-85° C.

During the subsequent coagulation step only enough heat has to be applied to the liquid to maintain its temperature in a range of about 80°-90° C. for a period of time of about 20-50 minutes. This can be done, for example, by one of the following three alternative processes of supplying heat:

(1) Apply continuously a rather minimal level of microwave energy necessary for the aforementioned temperature maintenance.
(2) A constant temperature hot water bath.
(3) A warm room with storage shelves in which hot air of constant temperature is circulated.

Another alternative is to use a combination of (2) and (3) of the above processes. The choice is to be determined by an economic analysis of investment and production costs of a process.

A further improvement to the process in the form of another alternative for the coagulation step has been studied and found feasible. This alternative is to have the warm rooms in series with the first room operated at a temperature range of about 80°-90° C. and the second room operated at about 50°-65° C. Upon expiration of a predetermined residence time in the first warm room, the containers are conveyed immediately to the second warm room. The sum of residence times in these room is not much larger than residence time in a single warm room operated at a temperature range of about 80°-90° C. In particular, residence time in the first warm room is about 10-15 minutes and in the second warm room about 15-25 minutes. Two warm rooms in series would be advantageous due to lower capital investment and lower operating costs than the aforementioned single warm room, which would more than outweigh the disadvantages of slightly longer total residence time than a single warm room.

The soybean curd so formed is cooled and put into refrigerated storage.

DETAILED DESCRIPTION OF PREFERRED EMBODIMENTS OF THE INVENTION

Figure 1:
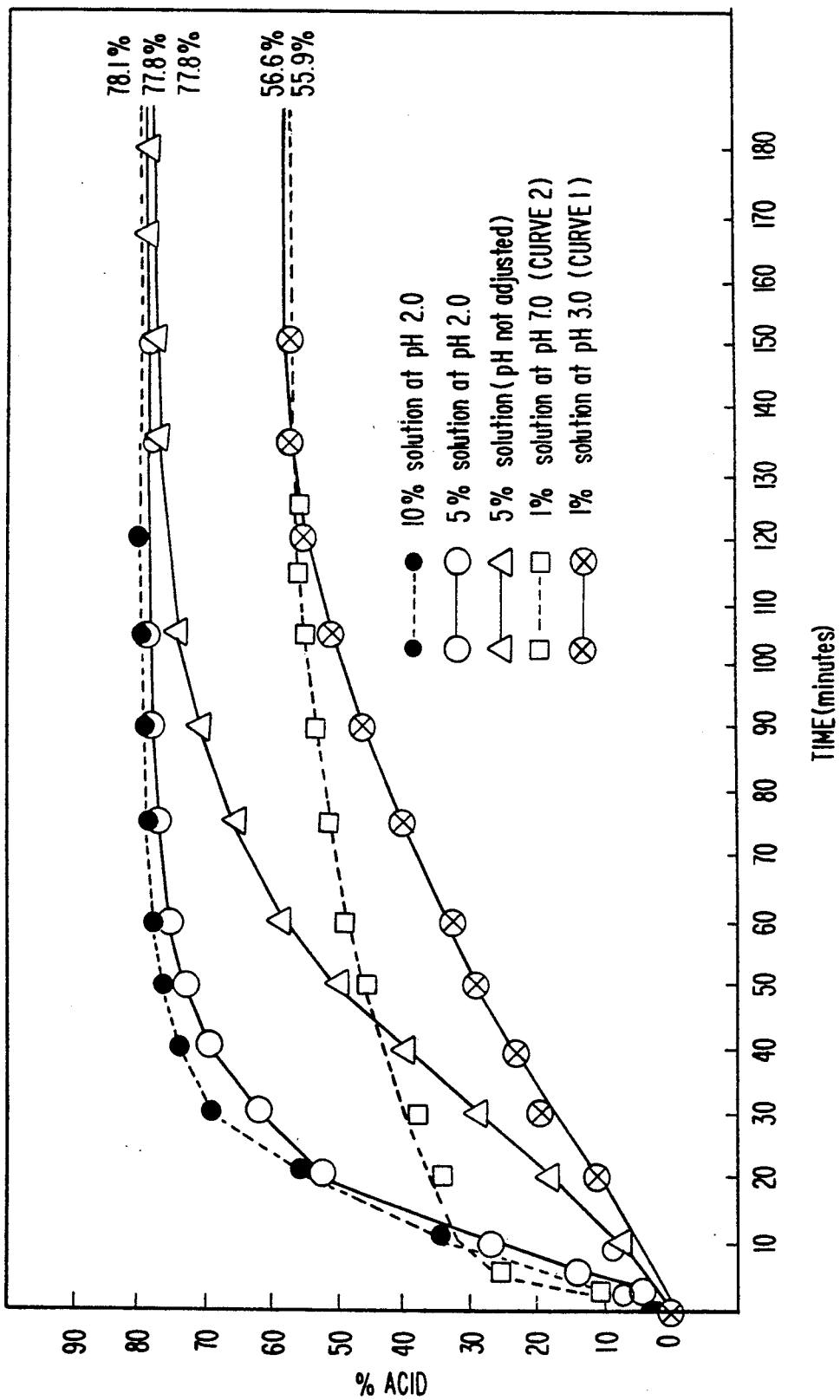
FIG. 1 is a heretofore published set of plots of hydrolysis of aqueous solutions of GDL at 20° C. measured as variation in percent gluconic acid with time.
Figure 2:
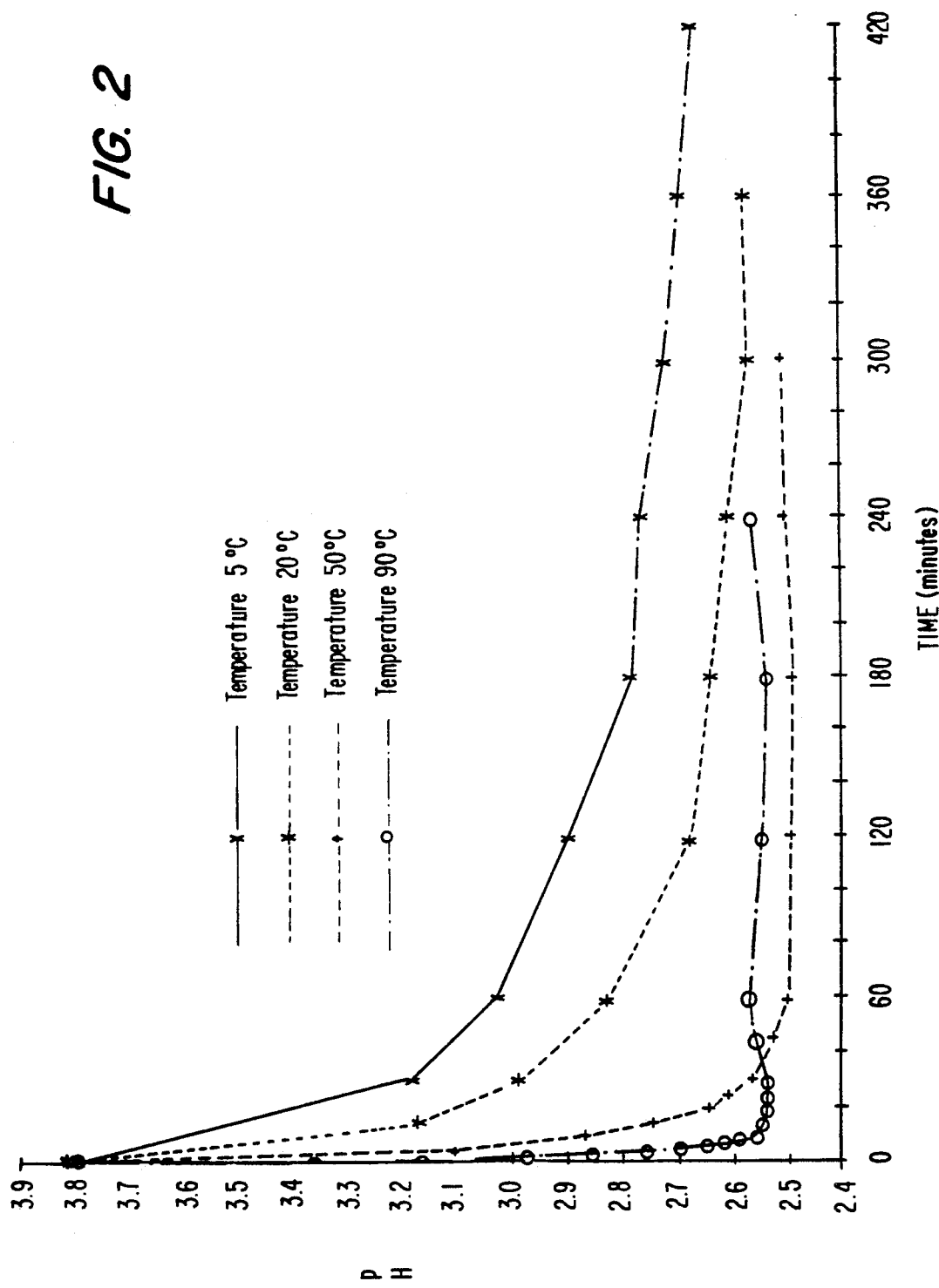
FIG. 2 is a heretofore published set of plots of degree of hydrolysis of GDL measured as variation in pH with time for a 1% GDL solution at various temperatures.
Figure 3:
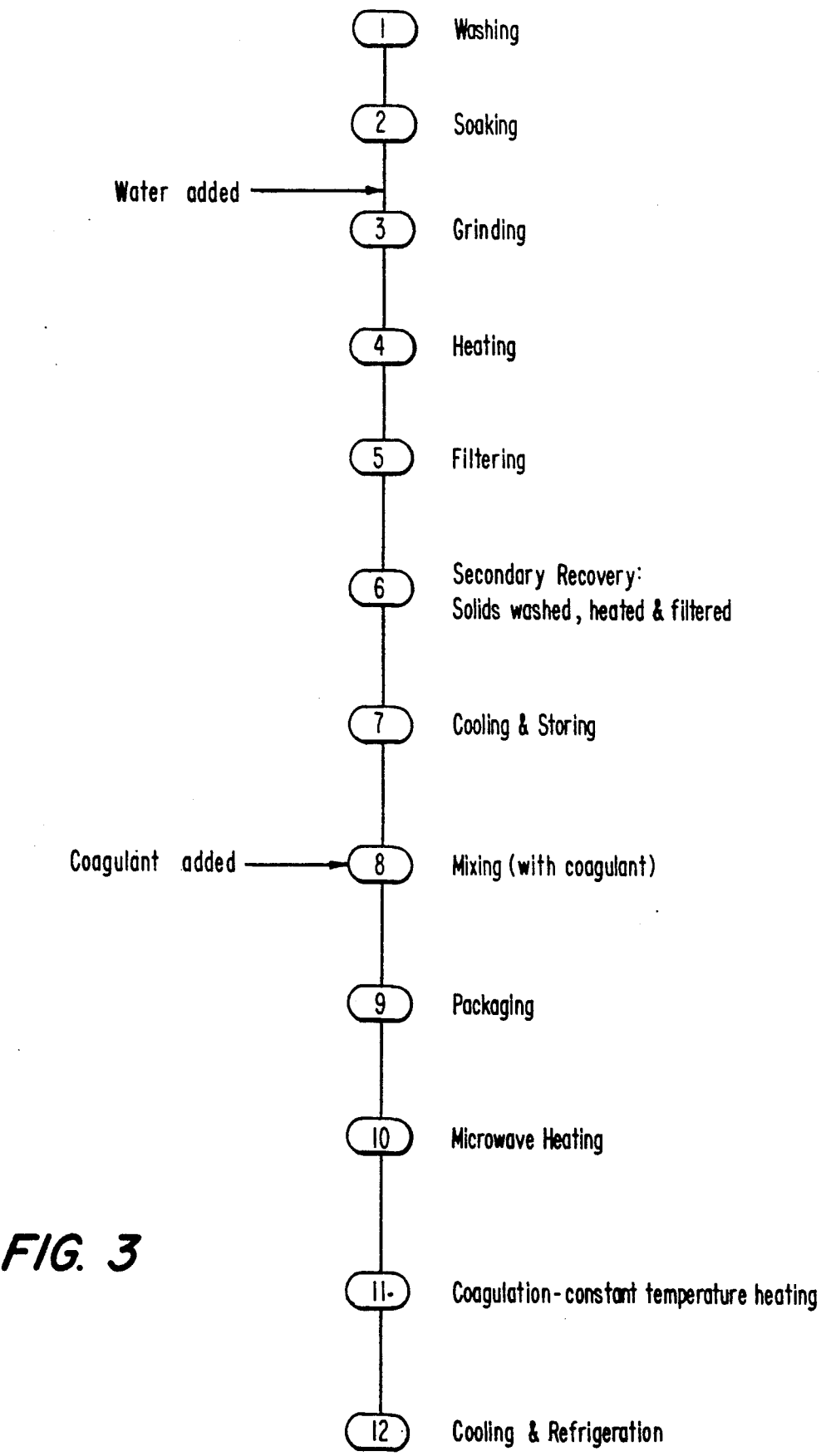
FIG. 3 is a flow chart of a process according to the invention.

As an illustrative example, this invention in the manufacturing of soybean curd can take the form of a production scheme composed of process steps represented in FIG. 3.

Dry soybeans are washed by jets of water or in a suitable washing tank, step 1 in FIG. 3. They are then put in a soaking tank with sufficient water added and left for a period of time sufficiently long for the beans to swell to maximum size, step 2. After the beans have swollen to maximum size, a large quantity of water is added. This mass is fed to a grinding machine to be ground, step 3, and the ground beans go to a storage tank, which also serves as a heating vat. The ground mass is heated to boiling point and then kept at 100° C. for another 3-8 minutes, step 4, and afterwards is filtered by means of a rotary drum, vibrating screen, or other type of machinery, step 5, to separate the solids from the liquid, the liquid being the soybean milk. In step 6, the solids are washed with water and are heated together with wash water, and after filtration the liquor is combined with the soybean milk from step 5. The soybean milk is then sent to a storage tank where it is cooled and its solids content adjusted to a desired concentration level by adding more water to the soybean milk, step 7. In the next step, 8, the soybean milk is introduced into a mixing tank into which an appropriate amount of coagulant or coagulants is also introduced, followed by thorough mixing. The coagulant-soybean milk mixture can now be pumped continuously to a packaging machine, step 9, wherein open plastic packaging tubs or containers, in a size suitable for supermarket sale, are filled with the coagulant-soybean milk mixture and then each is sealed with a plastic film and topped with a snap-on plastic cover. The filled tubs are transported by conveyor belt at predetermined speed through a microwave heating tunnel oven, step 10. In place of a tunnel, box type microwave ovens arranged in series can carry out the job equally well and in a continuous manner. Constant temperature heating for the coagulation and formation of soybean curd, step 11, is carried out by sending the products of step 10 to a warm room or series of two warm rooms maintained at certain temperatures as mentioned hereinabove and by keeping them in this warm room or rooms for predetermined times also as mentioned hereinabove. The finished products are then cooled and stored in refrigerated room, step 12.

In all the experiments carried out in making this invention, the soybean milk used for each experiment was made in the following identical way. 1 lb. of dry soybean was weighed and placed in a tank. Water was added in sufficient quantity and the mass was left standing for a sufficient time for the soybeans to swell to a maximum. More water was then added to the mass so that wet grinding of the swollen soybeans could be effected. The ground mass was heated to boiling and then kept at 100° C. for another 3-8 minutes. This was followed by filtration while the mass was still hot and the filtrate was retained as the soybean milk. A quantity of water was added to the filter cake and the resultant mixture was heated to boiling to effect secondary extraction. Filtrate from the mixture was combined into the primary batch of soybean milk. In all, this series of steps used a volume of water four times the volume of dry soybean.

Before the soybean milk was used to produce soybean curd, its solids content was tested and adjusted. From a series of control experiments it had been determined that solids contents of about 10–14%, especially 10.5–13.8%, gave excellent quality soybean curd products. Regarding the amount of the coagulant GDL used in each experiment to produce soybean curd, the guideline of manufacturers of GDL was adopted, i.e., an amount of GDL equal to about 0.3–0.5% by weight of the weight of soybean milk was used. It was found that some improvement in processing conditions and product quality could be obtained when a mixture of GDL and at least one divalent metal salt was used as coagulant; in particular, a firmer soybean curd having a less acidic taste is obtained. Preferred such salts are calcium sulfate, calcium chloride, calcium phosphate, and magnesium chloride. These could be used in addition to the about 0.3–0.5% by weight of GDL or used to replace part of the GDL amount. Typical compositions of a mixture of coagulants consist of about 70% GDL, about 20–25% calcium sulfate and about 10–5% magnesium chloride. Other typical compositions are about 70–75% GDL and about 30–25% calcium sulfate.

A series of control experiments was carried out to produce soybean curd by heating soybean milk with coagulant (or a coagulant mixture) in a convection oven at constant temperature, without any microwave heating. Satisfactory conditions were found to be heating at a constant temperature level in the about 80°–90° C. range for a time period of about 40–50 minutes. Typically, it was found 50 minutes would be required for heating at 80° C., and 40 minutes would be required for heating at 90° C., to produce good quality soybean curd. The size of the test sample was varied in the range 2–10 oz. by weight.

For the series of experiments undertaken to demonstrate the present invention, a microwave oven and a convection oven were used in series, the convection oven simulating a warm room. The microwave power given out in the microwave oven was 350 watts. As in the control experiments, the size of the test samples of soybean milk-coagulant mixture was varied in the 2–10 oz. weight range.

The time period each sample was subject to microwave energy was calculated to be such that the temperature of the interior of the soybean milk would rise to about the 75°–85° C. range. Any variation in the spot temperatures in the liquid was found not to have affected the final result of soybean curd formation.

An average value of time exposure of 80 seconds for each 3.5 oz. of soybean milk yielded good results, and an operating range of about 60–100 seconds gave good quality product. When a sample left the microwave oven it could be observed that the soybean milk had thickened considerably to become a heavy paste. The sample was next introduced into the convection oven. The temperature inside the convection oven was set at 85° C. In the convection oven, the coagulation of soybean milk was completed and soybean curd formed, after which the sample could be put into refrigerated storage. It was found that a heating period of about 20–35 minutes in the convection oven yielded good quality soybean curd. It was also found that 28–30 minutes was the optimum time period. Furthermore, it was determined that variation in the size of th sample did not require changes in temperature level in the convection oven or in the residence time in the convection oven.

In another set of experiments two samples were used. One sample followed the procedures above. The other sample was subject to the following process variation of the coagulation step after the microwave heating step. The sample was first put in a convection oven operated at 85° C. for 15 minutes. After this, it was placed in a second convection oven operated at 60° C. for 15 minutes. Both samples yielded good quality soybean curd.

What I claim is:

1. A method of manufacturing soybean curd, comprising mixing soybean milk with a coagulating agent to form a liquid mixture, continuously filling the resulting liquid mixture into containers, continuously passing the containers through a zone in which the liquid mixture receives sufficient microwave energy from microwave energy sources of sufficient power relative to the weight of the soybean milk in the liquid mixture and for a sufficient period of time to heat the interior of the mixture to a temperature in a range of about 75° C. to about 85° C., removing the containers from the zone and maintaining the containers at a temperature in a range of about 80° C. to about 90° C. for a period of about 20 to about 50 minutes to coagulate the mixture in the containers to form soybean curd, and cooling and storing the soybean curd in a refrigerated room.

2. A method according to claim 1, wherein the coagulating agent comprises glucono-delta-lactone.

3. A method according to claim 2, in which the power of the microwave energy sources relative to the weight of the soybean milk is about 350 watts per 3.5 ounces, by weight, of the soybean milk and the period of time in which the liquid mixture receives the microwave energy is about 60 to about 100 seconds.

4. A method according to claim 2, wherein the coagulating agent consists of glucono-delta-lactone.

5. A method according to claim 2, wherein the coagulating agent consists of a mixture of glucono-delta-lactone and at least one divalent metal salt.

6. A method according to claim 5, in which the divalent metal salts are selected from the group consisting of calcium chloride, calcium phosphate, calcium sulfate, and magnesium chloride.

7. A method according to claim 2, in which the proportion of glucono-delta-lactone mixed with the soybean milk is about 0.3 to about 0.5% by weight based on the weight of the soybean milk.

8. A method according to claim 4, in which the proportion of glucono-delta-lactone mixed with the soybean milk is about 0.3 to about 0.5% by weight based on the weight of the soybean milk.

9. A method according to claim 5, in which the proportion of glucono-delta-lactone in the coagulating agent mixture is about 70 to about 75% by weight based on the weight of the coagulating agent mixture.

10. A method according to claim 1, in which the containers are maintained at the temperature in the range of about 80° C. to about 90° C. for the period of about 20 to about 50 minutes by keeping the containers in a warm room heated to the corresponding temperature and for the corresponding period.

11. A method according to claim 1, in which the containers are maintained at the temperature in the range of about 80° C. to about 90° C. for the period of about 20 to about 50 minutes by passing the containers through a constant temperature bath heated to the corresponding temperature and for the corresponding period.

12. A method of manufacturing soybean curd, comprising mixing soybean milk with a coagulating agent to form a liquid mixture, continuously filling the resulting liquid mixture into containers, continuously passing the containers through a zone in which the liquid mixture receives sufficient microwave energy from microwave energy sources of sufficient power relative to the weight of the soybean milk in the liquid mixture and for a sufficient period of time to heat the interior of the mixture to a temperature in a range of about 75° C. to about 85° C., conveying the containers from the zone to a first warm room and keeping the containers in the first warm room at a temperature in a range of about 80° C. to about 90° C. for a period of about 10 to about 15 minutes and immediately thereafter conveying the containers to and keeping the containers in a second warm room at a temperature in a range of 50° C. to about 65° C. for a period of about 15 to about 25 minutes to coagulate the mixture in the containers to form soybean curd, and cooling and storing the soybean curd in a refrigerated room.

13. A method according to claim 12, wherein the coagulating agent comprises glucono-delta-lactone.

14. A method according to claim 13, in which the power of the microwave energy sources relative to the weight of the soybean milk is about 350 watts per 3.5 ounces, by weight, of the soybean milk and the period of time in which the liquid mixture receives the microwave energy is about 60 to about 100 seconds.

15. A method according to claim 13, wherein the coagulating agent consists of glucono-delta-lactone.

16. A method according to claim 13, wherein the coagulating agent consists of a mixture of glucono-delta-lactone and at least one divalent metal salt.

17. A method according to claim 16, in which the divalent metal salts are selected from the group consisting of calcium chloride, calcium phosphate, calcium sulfate, and magnesium chloride.

18. A method according to claim 13, in which the proportion of glucono-delta-lactone mixed with the soybean milk is about 0.3 to about 0.5% by weight based on the weight of the soybean milk.

19. A method according to claim 15, in which the proportion of glucono-delta-lactone mixed with the soybean milk is about 0.3 to about 0.5% by weight based on the weight of the soybean milk.

20. A method according to claim 16, in which the proportion of glucono-delta-lactone in the coagulating agent mixture is about 70 to about 75% by weight based on the weight of the coagulating agent mixture.

* * * * *